March 26, 1957     F. MAKARA     2,786,333
TIRE INFLATOR
Filed Sept. 20, 1954
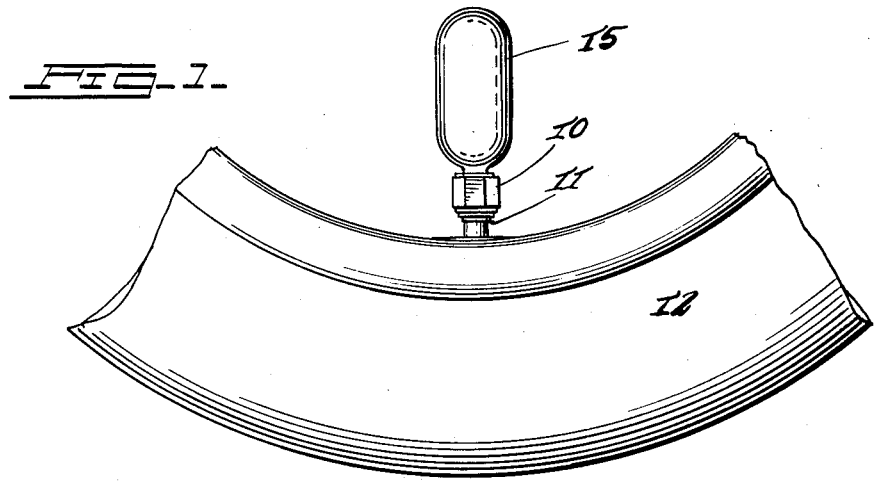
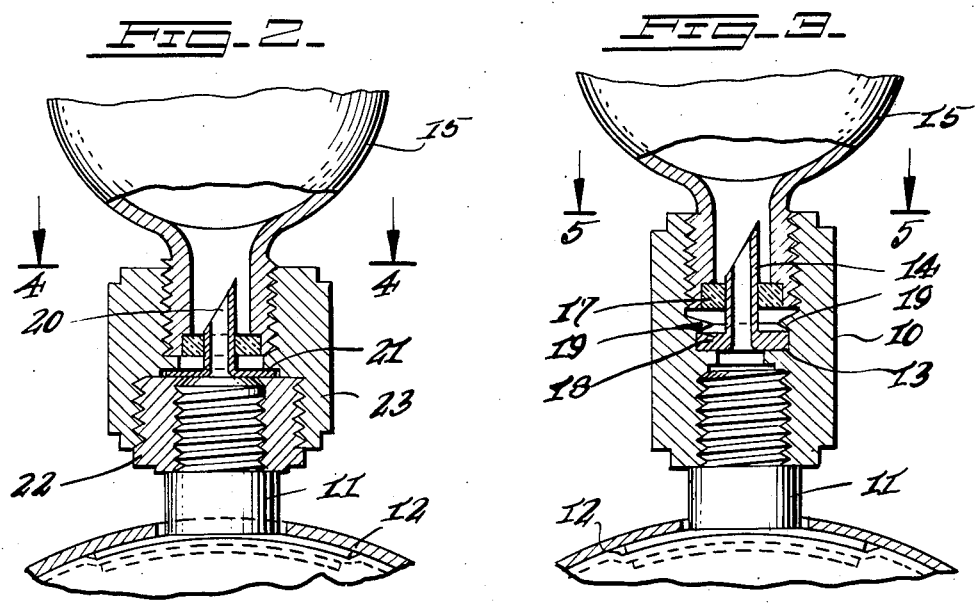
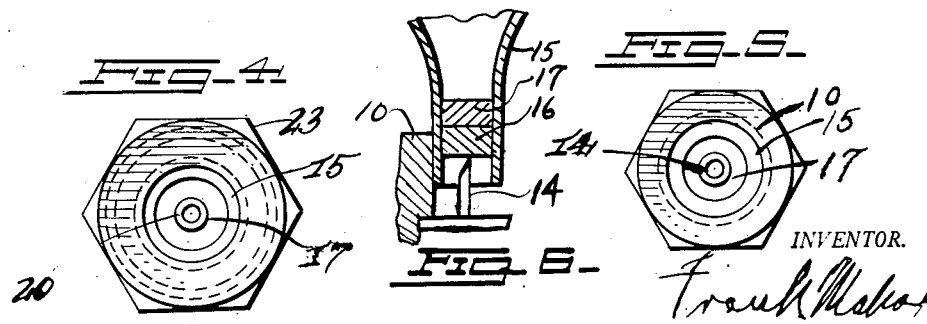
INVENTOR.
Frank Makara

United States Patent Office 2,786,333
Patented Mar. 26, 1957

2,786,333

TIRE INFLATOR

Frank Makara, New York, N. Y.

Application September 20, 1954, Serial No. 457,195

2 Claims. (Cl. 62—1)

This invention relates to an inflator and more particularly to an inflator for use in inflating automobile tire tubes on an automobile wheel.

In modern automobile travel on crowded highways the presence of a stalled car on the highway due to a flat tire is a common cause of congestion as well as a danger to the driver changing a tire.

Most flat tires are caused by small air leaks so that they can be inflated and will remain inflated for a half-hour or more, thereby permitting the driver to safely drive to the nearest gas station where the attendant will repair the flat tire for a small charge.

It is an object of this invention to provide a device for instantly inflating a flat tire.

It is a further object of this invention to provide an adapter or connector attachment for a tire valve and having means for quickly releasing high pressure gas or easily gasified liquid from a resistant container.

These and other objects of this invention will become apparent upon reading the following disclosure taken in conjunction with the accompanying drawing in which:

Fig. 1 is a side view showing an adapter of this invention secured to a tire valve and having a high pressure resistant container secured thereto, Fig. 2 is a vertical section view, broken away in part, showing the manner of transferring the confined high pressure gas from a gas container and through the adapter or inflator and into the tire tube, Fig. 3 is a modification similar to that of Fig. 2 but showing another manner of securing a piercing prong in the inflator, Fig. 4 is a view taken on line 4—4 of Fig. 2, Fig. 5 is a view taken on line 5—5 of Fig. 3, and Fig. 6 is a partial broken-away view of another modification of Fig. 2.

Referring to Fig. 3 of the drawing the adapter of this invention is provided with a tubular housing 10 having a screw threaded aperture in one end of the tube of the housing and adapted to engage the tire valve 11 of an automobile tire 12.

The exterior of housing 10 may be polygonal for easy engagement with a wrench or it may be knurled or smooth walled for hand screwing.

The housing 10 is provided with a constricted tubular section formed by a transverse wall 13 projecting inwardly to form an aperture in the constricted tubular section. The circular horizontal wall 13 forms a seat upon which a removable tubular piercing prong 14, preferably of hard steel, is disposed.

The tubular housing 10 has the tube wall thereof provided at the end opposite the tire valve receiving end provided preferably with a screw thread adapted to engage the screw threads of a conventional high pressure resistant container 15.

Alternatively, the gas container receiving end of the tubular housing 10 may be smooth bored for rapid insertion of the pierceable nozzle of an insertable gas bomb 15. In the case of a smooth walled gas bomb nozzle the adaptor coacting receiving cavity is preferably lined with a rubber washer for grasping the nozzle and thus to prevent gas leakage. In lieu of a rubber washer, a pierceable and pliable rubber cap may be inserted over the smooth walled gas container nozzle prior to insertion into the co-acting cavity of the adapter. Also in lieu of a rubber washer or rubber cap, I may insert a rubber plug 16 in the well of the nozzle of those conventional gas bombs or containers having conventional sunken pierceable metal inserts 17.

In the modification shown in Fig. 3 the nozzle of the gas container is provided with screw threads which closely engage the threads of the tube of housing 10 to prevent leakage of gas should any gas escape between the piercing prong 14 and the co-acting container or gas bomb metal plug insert 17.

The prong 14 is provided with a sharp point adapted to pierce the metal plug by use of manual pressure, the plug 17 being of a toughness texture capable of being pierced by said manual pressure. The prong 17 is further provided with a base 18 adapted to be seated on wall 13 and is locked in place by displacing or peening suitable metal 19 from the tube wall of the housing 10.

Turning to Fig. 2, a removable prong 20 is seated in the tube of housing 10 against a housing seat 21 located adjacent the tire valve receiving end. In this modification (Fig. 2) a removeable tubular lock nut 22 is provided with interior threads for engaging the valve 11 and with exterior threads to engage the modified housing 23. In this modification a dull prong 20 may be easily replaced by a new or sharpened prong.

The gas bomb 15 of compressed air, carbon dioxide, etc. may be provided with liquified gas, for example liquid air, or it may be provided with highly compressed inert gas such as nitrogen.

Preferably the gas bomb 15 should be of a size capable of inflating a normal automobile tire with one application whereupon the exhausted bomb 15 is thrown away.

However, the gas bomb may be re-filled if desired and then re-plugged. Also a re-fillable bomb having a spring loaded valve therein, similar to the conventional tire tube valve, is operable, in which case the prong 14 would depress the spring loaded valve stem of the gas bomb.

This invention has been described by means of a plurality of embodiments. However, its scope is that of an adapter disposed between a valve and a gas bomb whereby the gas pressure of the bomb is transmitted safely and rapidly through the adapter into the valve, whether said valve is on a tire or on some other plastic or rubber inflatable article of manufacture.

I claim:

1. An inflator combination for dispensing compressed gas consisting of a gas bomb having a tubular nozzle, a metal plug sunk in said nozzle, a rubber plug disposed in said nozzle exteriorly of said sunken plug, a tubular housing removably disposed in a gas tight manner in said nozzle, and a tubular piercing prong for conveying gas therethrough disposed in said tube of said housing and adapted to pierce said rubber plug and said metal plug of said gas bomb.

2. A device for inflating an object with gas from a compressed gas container having a nozzle consisting of a tubular housing having a top tubular bore adapted to receive said nozzle in a gas tight manner and a bottom screw threaded bore of greater diameter than said top tubular bore, said tubular housing having a housing seat between said top bore and said bottom bore, a pierce prong having a flange rim disposed completely within said tubular housing with the rim disposed against said housing seat and the pierce prong disposed fully within the top bore, and a tubular lock nut having exteriorly disposed threads adapted to engage the threads of said bottom bore and to be secured against said rim of said pierce prong in a gas tight manner.

References Cited in the file of this patent

UNITED STATES PATENTS

| | | |
|---|---|---|
| 2,016,113 | Lambert et al. | Oct. 1, 1935 |
| 2,047,096 | Brewer | July 7, 1936 |
| 2,066,517 | Campbell | Jan. 5, 1937 |
| 2,498,596 | Wallach | Feb. 21, 1950 |
| 2,575,908 | Clifford | Nov. 20, 1951 |
| 2,667,760 | Curtis | Feb. 2, 1954 |
| 2,679,140 | Burchett | May 25, 1954 |
| 2,746,264 | Keys | May 22, 1956 |